United States Patent
Zhang et al.

(10) Patent No.: US 11,129,155 B2
(45) Date of Patent: Sep. 21, 2021

(54) METHOD FOR CONFIGURING TRANSMISSION DIRECTION OF TIME-FREQUENCY RESOURCE, AND APPARATUS

(71) Applicant: Huawei Technologies Co., Ltd., Shenzhen (CN)

(72) Inventors: Lili Zhang, Beijing (CN); Guorong Li, Shenzhen (CN); Hongcheng Zhuang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/607,033

(22) PCT Filed: May 5, 2017

(86) PCT No.: PCT/CN2017/083328
§ 371 (c)(1),
(2) Date: Oct. 21, 2019

(87) PCT Pub. No.: WO2018/192015
PCT Pub. Date: Oct. 25, 2018

(65) Prior Publication Data
US 2020/0137730 A1   Apr. 30, 2020

(30) Foreign Application Priority Data
Apr. 21, 2017   (CN) .......................... 201710267471.2

(51) Int. Cl.
*H04W 4/00*       (2018.01)
*H04W 72/04*      (2009.01)
(Continued)

(52) U.S. Cl.
CPC ......... *H04W 72/042* (2013.01); *H04L 5/0007* (2013.01); *H04L 5/14* (2013.01); *H04W 16/14* (2013.01); *H04W 72/044* (2013.01)

(58) Field of Classification Search
CPC . H04W 72/042; H04W 16/14; H04W 72/044; H04W 72/04; H04W 72/12;
(Continued)

(56) References Cited

U.S. PATENT DOCUMENTS 9,923,690 B2    3/2018  Ekpenyong
10,834,730 B2 *  11/2020  Zhang ................... H04L 5/1469
(Continued)

FOREIGN PATENT DOCUMENTS

CN     102523627 A    6/2012
CN     104105203 A    10/2014
(Continued)

OTHER PUBLICATIONS

"Discussion on duplexing flexibility and cross-link interference mitigation schemes," 3GPP TSG RAN WG1 Meeting#88, Athens, Greece, R1-1701616, pp. 1-8, 3rd Generation Partnership, Project, Valbonne, France (Feb. 13-17, 2017).
(Continued)

*Primary Examiner* — Abdelnabi O Musa
(74) *Attorney, Agent, or Firm* — Leydig, Voit & Mayer, Ltd.

(57) ABSTRACT

This application provides a method for configuring a transmission direction of a time-frequency resource, and an apparatus. A terminal device receives first configuration information sent by a first access network device and/or second configuration information sent by a second access network device, and transmits data based on the first configuration information and/or the second configuration information. The first configuration information includes con-
(Continued)

figuration information of a transmission direction of the first access network device in at least one resource unit, the second configuration information includes configuration information of a transmission direction of the second access device in at least one resource unit, and the at least one resource unit includes at least one of a frequency domain unit, a time domain unit, and a space domain unit.

25 Claims, 5 Drawing Sheets

(51) Int. Cl.
*H04L 5/00* (2006.01)
*H04L 5/14* (2006.01)
*H04W 16/14* (2009.01)

(58) Field of Classification Search
CPC . H04L 5/14; H04L 5/0007; H04L 5/00; H04L 5/001
See application file for complete search history.

(56) References Cited

U.S. PATENT DOCUMENTS

| | | | |
|---|---|---|---|
| 2013/0301492 A1 | 11/2013 | Ji et al. | |
| 2014/0307593 A1 | 10/2014 | Zhao et al. | |
| 2015/0043396 A1* | 2/2015 | Ekpenyong | H04L 5/1438 370/280 |
| 2015/0245346 A1* | 8/2015 | Yokomakura | H04L 5/00 370/329 |
| 2015/0264676 A1 | 9/2015 | Suzuki et al. | |
| 2016/0226650 A1* | 8/2016 | Chen | H04L 5/001 |
| 2018/0270848 A1* | 9/2018 | Liang | H04W 72/1289 |
| 2019/0029050 A1 | 1/2019 | Li et al. | |

FOREIGN PATENT DOCUMENTS

| | | |
|---|---|---|
| CN | 105682232 A | 6/2016 |
| CN | 106341891 A | 1/2017 |
| CN | 106559130 A | 4/2017 |
| EP | 2858446 A1 | 4/2015 |
| KR | 20150060876 A | 6/2015 |
| RU | 2015120761 A | 12/2016 |
| WO | 2017038531 A1 | 3/2017 |
| WO | 2017041683 A1 | 3/2017 |
| WO | 2017054545 A1 | 4/2017 |
| WO | 2017173660 A1 | 10/2017 |

OTHER PUBLICATIONS

"Overview of Duplexing and Interference Management," 3GPP TSG RAN WG1 Meeting#88bis, Spokane, Washington, USA, R1-1704433, pp. 1-10, 3rd Generation Partnership, Project, Valbonne, France (Apr. 3-7, 2017).

"Transmission direction identification via OTA signaling," 3GPP TSG RAN WG1 Meeting #88bis, Spokane, USA, R1-1704483, pp. 1-4, 3rd Generation Partnership, Project, Valbonne, France (Apr. 3-7, 2017).

"3rd Generation Partnership Project; Technical Specification Group Radio Access Network; Evolved Universal Terrestrial Radio Access (E-UTRA); Physical channels and modulation (Release 14)," 3GPP TS 36.211 V14.2.0, pp. 1-196, 3rd Generation Partnership Project, Valbonne, France (Mar. 2017).

"3rd Generation Partnership Project; Technical Specification Group Radio Access Network; NR; Radio Resource Control (RRC); Protocol specification (Release 15)," 3GPP TS 38.331 V0.0.2, pp. 1-13, 3rd Generation Partnership Project, Valbonne, France (Mar. 2017).

* cited by examiner

METHOD FOR CONFIGURING TRANSMISSION DIRECTION OF TIME-FREQUENCY RESOURCE, AND APPARATUS

CROSS-REFERENCE TO RELATED APPLICATIONS

This application is a National Stage of International Patent Application No. PCT/CN2017/083328, filed on May 5, 2017, which claims priority to Chinese Patent Application No. 201710267471.2, filed on Apr. 21, 2017. Both of the aforementioned applications are hereby incorporated by reference in their entireties.

TECHNICAL FIELD

Embodiments of this application relate to communications technologies, and in particular, to a method for configuring a transmission direction of a time-frequency resource, and an apparatus.

BACKGROUND

As asymmetry between uplink services and downlink services increases in a communications system and a ratio of the uplink services to the downlink services keeps changing with time, an existing method for using fixed paired spectrums and an existing method for using fixed uplink and downlink slot allocation can no longer effectively support a dynamic asymmetry feature of the services. In flexible duplex, growth of a total service volume and the asymmetry feature are fully considered, and uplink and downlink resources can be adaptively allocated based on distribution of the uplink services and the downlink services, thereby effectively improving system resource utilization to meet a future network requirement.

In a flexible frequency band technology, some frequency bands in a frequency division duplex (FDD) system are configured as flexible frequency bands. In actual application, based on distribution of uplink services and downlink services in a network, flexible frequency bands are allocated for uplink transmission or downlink transmission, so that uplink and downlink spectrum resources match uplink and downlink service requirements, thereby improving spectrum utilization. For example, when a downlink service volume is higher than an uplink service volume in a network, a frequency band originally used for uplink transmission may be configured as a frequency band used for downlink transmission in the network. In a flexible duplex technology, time division duplex (TDD) may be used on the frequency band to transmit uplink and downlink services. In a Long Term Evolution (LTE) system, there are a total of seven different subframe configuration modes in uplink and downlink configurations of the TDD. Each configuration mode is used to describe whether a transmission direction of each of ten subframes included in one cycle is uplink or downlink or whether the subframe is a special subframe. In an existing mobile communications network, a base station selects one of the seven configuration modes based on factors such as a service requirement collected in a long term, and notifies a terminal device or another base station of the configuration mode through static or semi-static configuration. In this way, the terminal device transmits data with the base station based on an uplink transmission direction and a downlink transmission direction specified in the configuration mode, so that the another base station can perform interference processing, scheduling control, or other configuration operations based on the configuration mode.

As the communications system evolves, a cell radius becomes increasingly smaller, a relatively small quantity of terminal devices are connected to each base station, and services in a cell fluctuate relatively greatly. Therefore, a resource transmission direction needs to be configured more flexibly to transmit information, so as to adapt to a more dynamic service change. However, in the prior art, the resource transmission direction can be configured only by selecting one of the foregoing several limited configuration modes. Consequently, a dynamically changing service requirement cannot be met.

SUMMARY

This application provides a method for configuring a transmission direction of a time-frequency resource, and an apparatus, so that configuration of a transmission direction of a time-frequency-space resource becomes more flexible and a dynamically changing service requirement can be met.

A first aspect of this application provides a method for configuring a transmission direction of a time-frequency resource, including: receiving, by a terminal device, first configuration information sent by a first access network device, and transmitting data based on the first configuration information, where the first configuration information includes configuration information of a transmission direction of the first access network device in at least one resource unit, and the at least one resource unit includes at least one of a frequency domain unit, a time domain unit, and a space domain unit.

In a possible implementation, the method further includes: receiving, by the terminal device, second configuration information sent by a second access network device, where the second configuration information includes configuration information of a transmission direction of the second access network device in at least one resource unit, and the at least one resource unit includes at least one of a frequency domain unit, a time domain unit, and a space domain unit.

In a possible implementation, the first configuration information is carried on a type 1 physical downlink control channel PDCCH, and the type 1 PDCCH is used to carry configuration information of a transmission direction of a time-frequency resource or a time-frequency-space resource.

In a possible implementation, the second configuration information is carried on a type 1 physical downlink control channel PDCCH, and the type 1 PDCCH is used to carry configuration information of a transmission direction of a time-frequency resource or a time-frequency-space resource.

In a possible implementation, the method further includes: receiving, by the terminal device, activation indication information that is of the type 1 PDCCH and that is sent by the first access network device.

In a possible implementation, the method further includes: receiving, by the terminal device, activation indication information that is of the type 1 PDCCH and that is sent by the second access network device.

In a possible implementation, the terminal device further receives effective-time information of the first configuration information and/or effective-time information of the second configuration information.

In a possible implementation, the type 1 PDCCH includes first DCI, and the first DCI includes configuration information of a transmission direction of at least one resource unit and/or effective-time information of the configuration information.

In a possible implementation, the type 1 PDCCH includes first DCI, and the first DCI includes configuration information of a transmission direction of at least one resource unit and/or effective-time information of the configuration information.

In a possible implementation, the first DCI includes at least one information block, and each information block includes configuration information of a transmission direction of at least one resource unit and/or an effective time of the configuration information.

In a possible implementation, the method further includes: receiving, by the terminal device, higher layer configuration signaling sent by a network device, where the higher layer configuration information includes a parameter of a start resource location of each information block; and reading each information block from the type 1 PDCCH based on the start resource location of each information block.

In a possible implementation, the method further includes: receiving, by the terminal device, sending resource information for the first configuration information, and/or receiving sending resource information for the second configuration information, where a first sending resource indicated by the sending resource information for the first configuration information is orthogonal to a second sending resource indicated by the sending resource information for the second configuration information.

A second aspect of this application provides a method for configuring a transmission direction of a time-frequency resource, including: sending, by a first access network device, first configuration information, where the first configuration information includes configuration information of a transmission direction of the first access network device in at least one resource unit, and the at least one resource unit includes at least one of a frequency domain unit, a time domain unit, and a space domain unit.

In a possible implementation, the method further includes: receiving, by the first access network device, second configuration information sent by a second access network device, where the second configuration information includes configuration information of a transmission direction of the second access network device in at least one resource unit, and the at least one resource unit includes at least one of a frequency domain unit, a time domain unit, and a space domain unit.

In a possible implementation, the first configuration information is carried on a type 1 physical downlink control channel PDCCH, and the type 1 PDCCH is used to carry configuration information of a transmission direction of a time-frequency resource or a time-frequency-space resource.

In a possible implementation, the second configuration information is carried on a type 1 physical downlink control channel PDCCH, and the type 1 PDCCH is used to carry configuration information of a transmission direction of a time-frequency resource or a time-frequency-space resource.

In a possible implementation, the method further includes: negotiating, by the first access network device, with the second access network device, to determine a first sending resource used for sending the first configuration information and a second sending resource used for sending the second configuration information, where the first sending resource is orthogonal to the second sending resource.

A third aspect of this application provides a terminal device, including:

a receiving module, configured to receive first configuration information sent by a first access network device, where the first configuration information includes configuration information of a transmission direction of the first access network device in at least one resource unit, and the at least one resource unit includes at least one of a frequency domain unit, a time domain unit, and a space domain unit; and a transmission module, configured to transmit data based on the first configuration information.

In a possible implementation, the receiving module is further configured to receive second configuration information sent by a second access network device, where the second configuration information includes configuration information of a transmission direction of the second access network device in at least one resource unit, and the at least one resource unit includes at least one of a frequency domain unit, a time domain unit, and a space domain unit.

In a possible implementation, the first configuration information is carried on a type 1 physical downlink control channel PDCCH, and the type 1 PDCCH is used to carry configuration information of a transmission direction of a time-frequency resource or a time-frequency-space resource.

In a possible implementation, the second configuration information is carried on a type 1 physical downlink control channel PDCCH, and the type 1 PDCCH is used to carry configuration information of a transmission direction of a time-frequency resource or a time-frequency-space resource.

In a possible implementation, the receiving module is further configured to receive activation indication information that is of the type 1 PDCCH and that is sent by the first access network device.

In a possible implementation, the receiving module is further configured to receive activation indication information that is of the type 1 PDCCH and that is sent by the second access network device.

In a possible implementation, the type 1 PDCCH includes first DCI, and the first DCI includes configuration information of a transmission direction of at least one resource unit and/or effective-time information of the configuration information.

In a possible implementation, the type 1 PDCCH includes first DCI, and the first DCI includes configuration information of a transmission direction of at least one resource unit and/or effective-time information of the configuration information.

In a possible implementation, the first DCI includes at least one information block, and each information block includes configuration information of a transmission direction of at least one resource unit and/or an effective time of the configuration information.

In a possible implementation, the receiving module is further configured to: receive higher layer configuration signaling sent by a network device, where the higher layer configuration information includes a parameter of a start resource location of each information block; and read each information block from the type 1 PDCCH based on the start resource location of each information block.

In a possible implementation, the receiving module is further configured to receive effective-time information of the first configuration information and/or effective-time information of the second configuration information.

In a possible implementation, the receiving module is further configured to:

receive sending resource information for the first configuration information, and/or receive sending resource information for the second configuration information, where a first sending resource indicated by the sending resource information for the first configuration information is orthogonal to a second sending resource indicated by the sending resource information for the second configuration information.

A fourth aspect of this application provides a first access network device, including:

a sending module, configured to send first configuration information, where the first configuration information includes configuration information of a transmission direction of the first access network device in at least one resource unit, and the at least one resource unit includes at least one of a frequency domain unit, a time domain unit, and a space domain unit.

In a possible implementation, the first access network device further includes: a receiving module, configured to receive second configuration information sent by a second access network device, where the second configuration information includes configuration information of a transmission direction of the second access network device in at least one resource unit, and the at least one resource unit includes at least one of a frequency domain unit, a time domain unit, and a space domain unit.

In a possible implementation, the first access network device further includes: a determining module, configured to negotiate with the second access network device, to determine a first sending resource used for sending the first configuration information and a second sending resource used for sending the second configuration information, where the first sending resource is orthogonal to the second sending resource.

In a possible implementation, the first configuration information is carried on a type 1 physical downlink control channel PDCCH, and the type 1 PDCCH is used to carry configuration information of a transmission direction of a time-frequency resource or a time-frequency-space resource.

In a possible implementation, the second configuration information is carried on a type 1 physical downlink control channel PDCCH, and the type 1 PDCCH is used to carry configuration information of a transmission direction of a time-frequency resource or a time-frequency-space resource.

A fifth aspect of this application provides a terminal device, including a processor, a memory, and a transceiver. The memory is configured to store an instruction. The transceiver is configured to communicate with another device. The processor is configured to execute the instruction stored in the memory, to perform the following method:

receiving first configuration information sent by a first access network device, where the first configuration information includes configuration information of a transmission direction of the first access network device in at least one resource unit, and the at least one resource unit includes at least one of a frequency domain unit, a time domain unit, and a space domain unit; and transmitting data based on the first configuration information.

In a possible implementation, the processor is further configured to:

receive second configuration information sent by a second access network device, where the second configuration information includes configuration information of a transmission direction of the second access network device in at least one resource unit, and the at least one resource unit includes at least one of a frequency domain unit, a time domain unit, and a space domain unit.

In a possible implementation, the first configuration information is carried on a type 1 physical downlink control channel PDCCH, and the type 1 PDCCH is used to carry configuration information of a transmission direction of a time-frequency resource or a time-frequency-space resource.

In a possible implementation, the second configuration information is carried on a type 1 physical downlink control channel PDCCH, and the type 1 PDCCH is used to carry configuration information of a transmission direction of a time-frequency resource or a time-frequency-space resource.

In a possible implementation, the processor is further configured to receive activation indication information that is of the type 1 PDCCH and that is sent by the first access network device.

In a possible implementation, the processor is further configured to receive activation indication information that is of the type 1 PDCCH and that is sent by the second access network device.

In a possible implementation, the type 1 PDCCH includes first DCI, and the first DCI includes configuration information of a transmission direction of at least one resource unit and/or effective-time information of the configuration information.

In a possible implementation, the first DCI includes at least one information block, and each information block includes configuration information of a transmission direction of at least one resource unit and/or an effective time of the configuration information.

In a possible implementation, the processor is further configured to: receive higher layer configuration signaling sent by a network device, where the higher layer configuration information includes a parameter of a start resource location of each information block; and read each information block from the type 1 PDCCH based on the start resource location of each information block.

In a possible implementation, the processor is further configured to receive effective-time information of the first configuration information and/or effective-time information of the second configuration information.

In a possible implementation, the processor is further configured to: receive sending resource information for the first configuration information, and/or receive sending resource information for the second configuration information, where a first sending resource indicated by the sending resource information for the first configuration information is orthogonal to a second sending resource indicated by the sending resource information for the second configuration information.

A sixth aspect of this application provides an access network device, including a processor, a memory, and a transceiver. The memory is configured to store an instruction. The transceiver is configured to communicate with another device. The processor is configured to execute the instruction stored in the memory, to perform the following method: sending first configuration information, where the first configuration information includes configuration information of a transmission direction of the first access network device in at least one resource unit, and the at least one resource unit includes at least one of a frequency domain unit, a time domain unit, and a space domain unit.

In a possible implementation, the processor is further configured to receive second configuration information sent by a second access network device, where the second configuration information includes configuration information of a transmission direction of the second access network device in at least one resource unit, and the at least one resource unit includes at least one of a frequency domain unit, a time domain unit, and a space domain unit.

In a possible implementation, the first configuration information is carried on a type 1 physical downlink control channel PDCCH, and the type 1 PDCCH is used to carry configuration information of a transmission direction of a time-frequency resource or a time-frequency-space resource.

In a possible implementation, the second configuration information is carried on a type 1 physical downlink control channel PDCCH, and the type 1 PDCCH is used to carry configuration information of a transmission direction of a time-frequency resource or a time-frequency-space resource.

In a possible implementation, the processor is further configured to negotiate with the second access network device, to determine a first sending resource used for sending the first configuration information and a second sending resource used for sending the second configuration information, where the first sending resource is orthogonal to the second sending resource.

In the first aspect to the sixth aspect, in a possible implementation, the type 1 PDCCH is included in any one of the following subframes: a type 1 uplink subframe, a type 2 uplink subframe, a type 1 downlink subframe, and a type 2 downlink subframe;

the type 1 uplink subframe includes a PDCCH, a guard period, a physical uplink shared channel PUSCH, and a physical uplink control channel PUCCH;

the type 2 uplink subframe includes a PUCCH and a PUSCH;

the type 1 downlink subframe includes a PDCCH, a PDSCH, a guard period, and a PUCCH; and the type 2 downlink subframe includes a PDCCH and a PDSCH.

In the first aspect to the sixth aspect, in a possible implementation, a time domain resource in which the type 1 PDCCH is located is an orthogonal frequency division multiplexing OFDM symbol following a type 2 PDCCH, or a time domain resource in which the type 1 PDCCH is located is some of resources used for transmitting a type 2 PDCCH, where the type 2 PDCCH is used to carry scheduling information of the terminal device.

In the first aspect to the sixth aspect, in a possible implementation, transmit power of the type 1 PDCCH is greater than transmit power of the type 2 PDCCH, and the type 2 PDCCH is used to carry scheduling information of the terminal device.

In the first aspect to the sixth aspect, in a possible implementation, at least one of the first configuration information and the effective-time information of the first configuration information is carried by using higher layer signaling, and at least one of the second configuration information and the effective-time information of the second configuration information is carried by using higher layer signaling.

In the first aspect to the sixth aspect, in a possible implementation, the first configuration information is carried in a random access response message or a contention resolution message sent by the first access network device.

In the first aspect to the sixth aspect, in a possible implementation, the second configuration information is carried in a random access response message or a contention resolution message sent by the second access network device.

In the first aspect to the sixth aspect, in a possible implementation, the random access response message or the contention resolution message sent by the first access network device further includes the effective-time information of the first configuration information.

In the first aspect to the sixth aspect, in a possible implementation, the random access response message or the contention resolution message sent by the second access network device further includes the effective-time information of the second configuration information.

In the first aspect to the sixth aspect, in a possible implementation, the first configuration information is carried in a paging message sent by the first access network device.

In the first aspect to the sixth aspect, in a possible implementation, the second configuration information is carried in a paging message sent by the second access network device.

In the first aspect to the sixth aspect, in a possible implementation, the paging message sent by the first access network device further includes the effective-time information of the first configuration information.

In the first aspect to the sixth aspect, in a possible implementation, the paging message sent by the second access network device further includes the effective-time information of the second configuration information.

In the first aspect to the sixth aspect, in a possible implementation, the effective-time information includes at least one of the following information: an effect start moment and effective duration.

In the first aspect to the sixth aspect, in a possible implementation, when the effective-time information includes only the effective duration, a relationship between the effect start moment and notification time of the effective-time information is pre-specified or pre-configured.

In the first aspect to the sixth aspect, in a possible implementation, the frequency domain unit includes at least one of a frequency band, a sub-band, and a physical resource block PRB, the time domain unit includes at least one of a super frame, a frame, a slot, a subframe, a mini-subframe, a mini-slot, an OFDM symbol, and a time unit shorter than one OFDM symbol, and the space domain unit includes at least one of a beam and an antenna port, where the mini-subframe is shorter than the subframe, and the mini-slot is shorter than the slot.

In the first aspect to the sixth aspect, in a possible implementation, the first configuration information is scrambled by using a first radio network temporary identifier RNTI, and the second configuration information is scrambled by using a second RNTI.

In the first aspect to the sixth aspect, in a possible implementation, the first access network device and the second access network device have different transmission directions in at least one resource unit.

In the first aspect to the sixth aspect, in a possible implementation, a first sending resource used by the first access network device to send the first configuration information and a second sending resource used by the second access network device to send the second configuration information are configured by an operation, administration, and management OAM center.

According to the method for configuring a transmission direction of a time-frequency resource, and the apparatus provided in this application, the terminal device receives the first configuration information sent by the first access network device and/or the second configuration information sent by the second access network device, and transmits data based on the first configuration information and/or the second configuration information. The first configuration information includes the configuration information of the transmission direction of the first access network device in the at least one resource unit, the second configuration information includes the configuration information of the transmission direction of the second access device in the at least one resource unit, and the at least one resource unit includes at least one of a frequency domain unit, a time domain unit, and a space domain unit. In this method, one cycle includes an unlimited quantity of resource units and may include more types of resource units, and different types and different quantities of resource units correspond to more distribution manners, in other words, configuration modes or structures are also more diversified. In this way, configuration of a transmission direction of a time-frequency-space resource becomes more flexible, and a dynamically changing service requirement can be met.

DESCRIPTION OF EMBODIMENTS

This application provides a method for configuring a transmission direction of a time-frequency resource. The method provided in this application may be applied to various communications systems, for example, existing 2G, 3G, and 4G communications systems, and a future evolved network such as a 5G communications system, and for another example, a Long Term Evolution (LTE) system, a 3GPP related cellular system, and another communications system of this type. In particular, the method may be applied to a 5G ultra dense network (UDN) system. It should be noted that the 5G communications system may include scenarios such as machine-to-machine (M2M), D2M, macro-micro communication, enhanced mobile broadband (eMBB), ultra-reliable and low latency communications (uRLLC), and massive machine type communication (mMTC). These scenarios may include but are not limited to a communication scenario between base stations, a communication scenario between a base station and a terminal, a communication scenario between terminals, and the like. Technical solutions provided in the following embodiments of this application may also be applied to scenarios such as communication between a base station and a terminal, communication between base stations, and communication between terminals in a 5G (5th-Generation) communications system.

Figure 1:
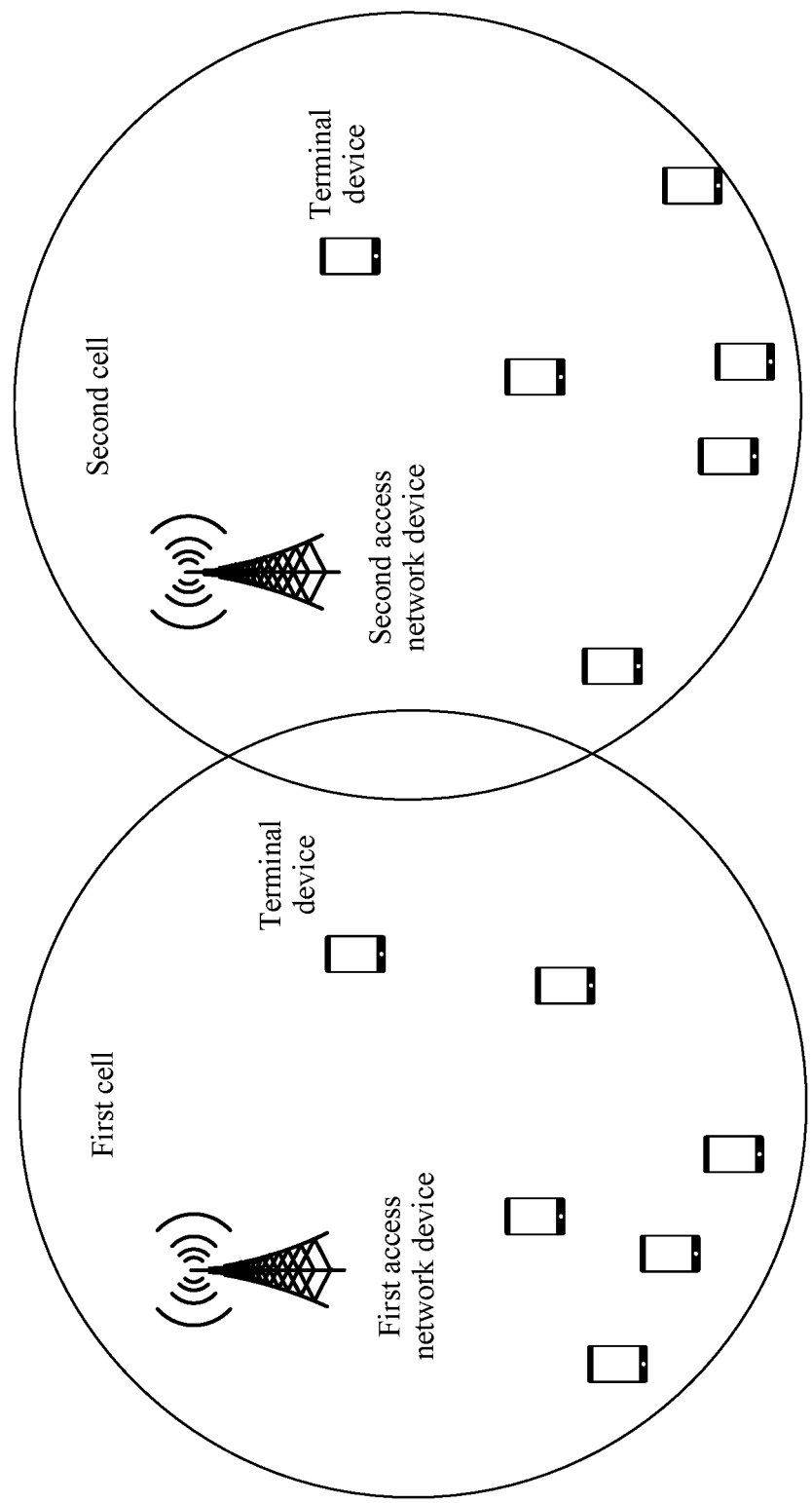
FIG. 1 is a schematic structural diagram of a communications system to which this application is applicable.

FIG. 1 is a schematic structural diagram of a communications system to which this application is applicable. As shown in FIG. 1, the communications system includes two cells: a first cell and a second cell. The first cell is adjacent to the second cell. An access network device of the first cell is a first access network device, and the first cell includes a plurality of terminal devices. An access network device of the second cell is a second access network device, and the second cell also includes a plurality of terminal devices.

It should be clarified that the first access network device, the second access network device, or another access network device mentioned in this application may be a base transceiver station (BTS) in a Global System for Mobile communications (GSM) or a Code Division Multiple Access (CDMA) system, or may be a NodeB (NB) in a Wideband Code Division Multiple Access (WCDMA) system, or may be an evolved NodeB (eNB), an access point (AP), or a relay station in a Long Term Evolution (LTE) system, or may be a base station (for example, a gNB or a transmission point (TRP)) in a 5G system, or may be a radio controller, a wearable device, or an in-vehicle device in a cloud radio access network (CRAN) scenario, or the like. This is not limited herein.

The base station may include a building baseband unit (BBU) and a remote radio unit (RRU). The RRU is connected to an antenna system (in other words, an antenna), and the BBU and the RRU may be split for use based on a need. It should be noted that in a specific implementation process, the base station may alternatively have another general hardware architecture.

The terminal device mentioned in this application may be user equipment (UE), an access terminal, a UE unit, a UE station, a mobile station, a mobile station, a remote station, a remote terminal, a mobile device, a UE terminal, a terminal, a wireless communications device, a UE agent, a UE apparatus, or the like. The terminal device may alternatively be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal in a future 5G network, a terminal in a future evolved PLMN network, or the like.

Figure 2:
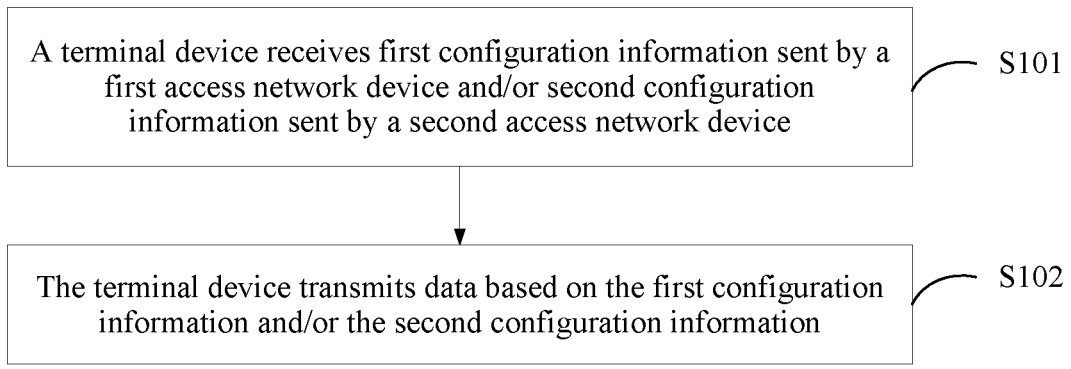
FIG. 2 is a flowchart of a method for configuring a transmission direction of a time-frequency resource according to Embodiment 1.

FIG. 2 is a flowchart of a method for configuring a transmission direction of a time-frequency resource according to Embodiment 1. As shown in FIG. 2, the method provided in this embodiment includes the following steps.

Step S101: A terminal device receives first configuration information sent by a first access network device and/or second configuration information sent by a second access network device.

The first configuration information includes configuration information of a transmission direction of the first access network device in at least one resource unit, and the at least one resource unit includes at least one of a frequency domain unit, a time domain unit, and a space domain unit. The second configuration information includes configuration information of a transmission direction of the second access device in at least one resource unit, and the at least one resource unit includes at least one of a frequency domain unit, a time domain unit, and a space domain unit.

The terminal device may be a terminal device within coverage of the first access network device, or may be a terminal device within coverage of the second access network device. In this embodiment, the transmission direction is downlink or uplink. Downlink means a transmission direction from an access network device to the terminal device, and uplink means a transmission direction from the terminal device to an access network device. The configuration information of the transmission direction of the resource unit is used to indicate whether the transmission direction of the resource unit is downlink or uplink. When the resource unit includes a time domain unit, configuration information of a transmission direction of the time domain unit is used to indicate whether the transmission direction of the time domain unit is downlink or uplink. Likewise, configuration information of a transmission direction of a frequency domain unit is used to indicate whether the transmission direction of the frequency domain unit is downlink or uplink, and configuration information of a transmission direction of a space domain unit is used to indicate whether the transmission direction of the space domain unit is downlink or uplink.

In this embodiment, the frequency domain unit includes at least one of a frequency band, a sub-band, and a physical resource block (PRB). The time domain unit includes at least one of a super frame, a frame, a slot, a subframe, a mini-subframe, a mini-slot, an orthogonal frequency division multiplexing (OFDM) symbol, and a time unit shorter than one OFDM symbol. The space domain unit includes at least one of a beam and an antenna port.

Physical resource block (PRB): One PRB corresponds to 12 consecutive carriers in frequency domain (180 K when a carrier spacing is 15 K), and one slot (half a subframe, 0.5 ms) resource in time domain. The PRB includes 12 rows and 7 columns. Each column represents one OFDM symbol, and each row represents one subcarrier.

Resource element (RE): One resource element corresponds to one subcarrier in frequency and corresponds to one OFDM symbol in time domain.

Sub-band: The sub-band includes several subcarriers.

Frequency band: The frequency band is an entire carrier frequency band.

Slot: One slot corresponds to seven OFDM symbols and a slot length is 0.5 ms.

Subframe: One subframe includes two slots, and a subframe length is 1 ms.

Radio frame: One radio frame includes 10 subframes.

Super frame: One super frame includes 51 multiframes, and one multiframe includes 26 subframes.

Mini-subframe: A mini-subframe is also referred to as a mini subframe. A mini-subframe is shorter than a subframe and includes fewer OFDM symbols than a subframe does.

Mini-slot: A mini-slot is also referred to as a mini-slot. A mini-slot is shorter than a slot and includes fewer OFDM symbols than a slot does.

Figure 3:
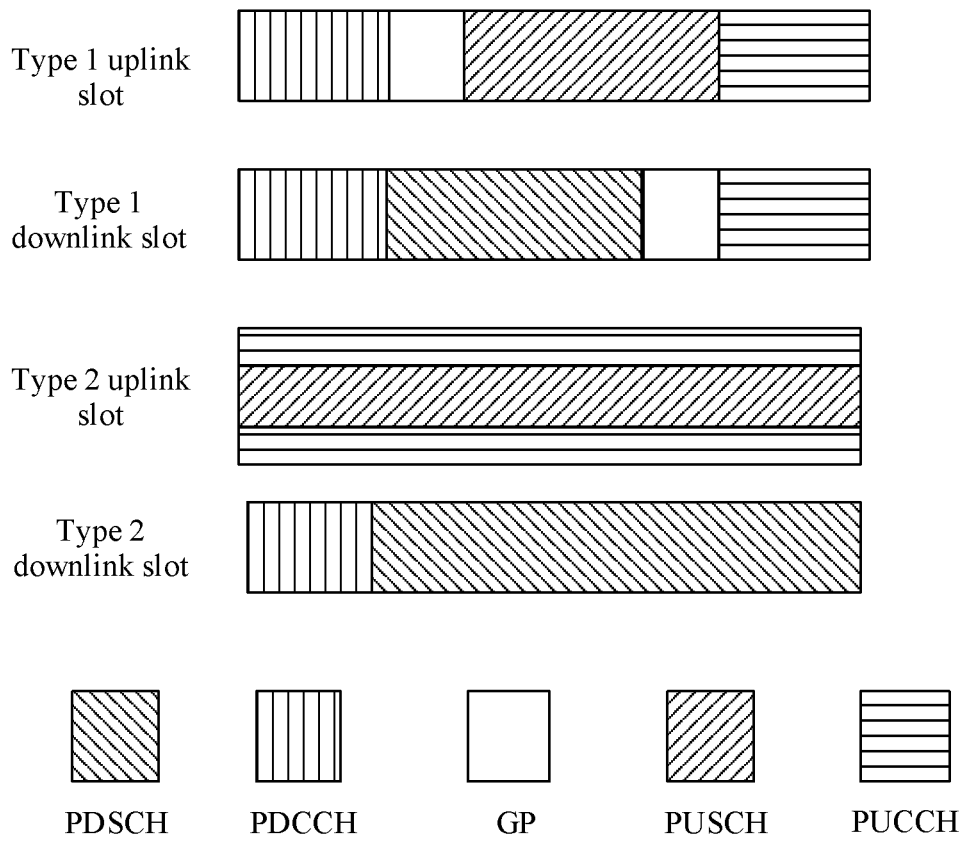
FIG. 3 is a schematic structural diagram of a type 1 slot and a type 2 slot.

A slot includes a type 1 slot and a type 2 slot. The type 2 slot has a same definition as a slot in an LTE system. The type 2 slot includes a type 2 uplink slot and a type 2 downlink slot. The type 2 uplink slot includes a physical uplink shared channel (PUSCH) and a physical uplink control channel (PUCCH). The type 2 downlink slot includes a physical downlink shared channel (PDSCH) and a physical downlink control channel (PDCCH). The type 1 slot is a new-type slot and is also referred to as a self-contained slot, a new radio slot, a bi-directional slot, or a hybrid slot. The type 1 slot includes a type 1 downlink slot and a type 1 uplink slot. FIG. 3 is a schematic structural diagram of the type 1 slot and the type 2 slot. As shown in FIG. 3, the type 1 uplink slot includes a PDCCH, a PUSCH, and a PUCCH, and the type 1 downlink slot includes a PDCCH, a PDSCH, and a PUCCH. In the type 1 uplink slot, the PDCCH occupies first several OFDM symbols (for example, first two or first three OFDM symbols) in one subframe, the PUCCH occupies last several OFDM symbols (for example, last two or last three OFDM symbols) in the one subframe, the PUSCH occupies OFDM symbols between the PDCCH and the PUCCH, and there is a transition period or a guard period (GP) between the PDCCH and the PUSCH. In the type 1 downlink slot, the PDCCH occupies first several OFDM symbols (for example, first two or first three OFDM symbols) in one subframe, the PUCCH occupies last several OFDM symbols (for example, last two or last three OFDM symbols) in the one subframe, the PDSCH occupies OFDM symbols between the PDCCH and the PUCCH, and there is a transition period or a GP between the PDSCH and the PUCCH. The PDCCH is used to transmit downlink control information, the PUCCH is used to transmit uplink control information, the PUSCH is used to transmit uplink data, and the PDSCH is used to transmit downlink data.

A subframe includes a type 1 subframe and a type 2 subframe. The type 2 subframe is a subframe in an LTE system, and the type 2 subframe includes a type 2 uplink subframe and a type 2 downlink subframe. The type 2 uplink subframe includes a PUCCH and a PUSCH. The type 2 downlink subframe includes a PDCCH and a PDSCH. The type 1 subframe is a new-type subframe and is also referred to as a self-contained subframe, a new radio subframe, a bi-directional subframe, or a hybrid subframe. The type 1 subframe includes a type 1 downlink subframe and a type 1 uplink subframe. The type 1 uplink subframe and the type 1 uplink slot have a same structure, and the type 1 downlink subframe and the type 1 downlink slot have a same structure. As shown in FIG. 3, the type 1 uplink subframe includes a PDCCH, a GP, a PUSCH, and a PUCCH, and the type 1 downlink subframe includes a PDCCH, a PDSCH, a GP, and a PUCCH. The type 1 uplink subframe may also be referred to as an uplink-dominant subframe or an uplink-centered subframe, and the type 1 downlink subframe may also be referred to as a downlink-dominant subframe or a downlink-centered subframe. In the type 1 uplink subframe, the PDCCH occupies first several OFDM symbols (for example, first two or first three OFDM symbols) in one subframe, the PUCCH occupies last several OFDM symbols (for example, last two or last three OFDM symbols) in the one subframe, the PUSCH occupies OFDM symbols between the PDCCH and the PUCCH, and there is a guard period between the PDCCH and the PUSCH. In the type 1 downlink subframe, the PDCCH occupies first several OFDM symbols (for example, first two or first three OFDM symbols) in one subframe, the PUCCH occupies last several OFDM symbols (for example, last two or last three OFDM symbols) in the one subframe, the PDSCH occupies OFDM symbols between the PDCCH and the PUSCH, and there is a guard period between the PDSCH and the PUCCH.

Because a resource unit for configuring a transmission direction of a time-frequency-space resource is no longer limited to a subframe, but instead, a time-frequency-space resource unit is divided into smaller resource units (for example, a slot, a mini-subframe, a mini-slot, an OFDM symbol, or a time unit shorter than one OFDM symbol) or larger resource units (for example, a super frame), division of the time-frequency-space resource becomes more flexible. Further, because configuration of a transmission direction of a time-frequency-space resource is variable in space domain, in other words, different transmission directions may be configured in different space domain units, for example, different antenna ports or beams, when uplink and downlink transmission directions are configured based on these resource units of diverse forms and different sizes, configuration of a transmission direction of a time-frequency-space resource can become more flexible. In addition, one cycle includes an unlimited quantity of resource units and may include more types of resource units, and different types and different quantities of resource units correspond to more distribution manners, in other words, configuration modes or structures are also more diversified. In this way, configuration of a transmission direction of a time-frequency-space resource becomes more flexible, and a dynamically changing service requirement can be met.

In this embodiment, the terminal device may be in a connected mode, or may be in an idle mode. For a terminal device in the connected mode, both the first configuration information and the second configuration information may be carried on a type 1 PDCCH, and the type 1 PDCCH is used to carry configuration information of a transmission direction of a time-frequency resource or a time-frequency-space resource. In this embodiment, the type 1 PDCCH may be included in any one of the following subframes: a type 1 uplink subframe, a type 2 uplink subframe, a type 1 downlink subframe, and a type 2 downlink subframe. For structures of the type 1 uplink subframe, the type 2 uplink subframe, the type 1 downlink subframe, and the type 2 downlink subframe, refer to the foregoing descriptions. Details are not described herein again.

A specific location of a time-frequency resource occupied by the type 1 PDCCH in the type 1 uplink subframe, the type 2 uplink subframe, the type 1 downlink subframe, and the type 2 downlink subframe is not limited in this embodiment. For example, a time domain resource in which the type 1 PDCCH is located may be an OFDM symbol following the type 2 PDCCH, and the type 2 PDCCH is used to carry scheduling information of the terminal device, in other words, the type 2 PDCCH is a PDCCH in the LTE system. In the LTE system, the type 2 PDCCH occupies one or more of first three OFDM symbols in one subframe. Therefore, the time domain resource in which the type 1 PDCCH is located may be any one or more OFDM symbols following a third OFDM symbol, and the time domain resource in which the type 1 PDCCH is located may be consecutive or non-consecutive OFDM symbols. For example, the time domain resource in which the type 1 PDCCH is located is a fourth OFDM symbol or a fifth OFDM symbol. Alternatively, the time domain resource in which the type 1 PDCCH is located may be some of resources for transmitting the type 2 PDCCH. For example, the time domain resource in which the type 1 PDCCH is located occupies any one or two OFDM symbols in first three OFDM symbols in one subframe. The OFDM symbols occupied by the time domain resource in which the type 1 PDCCH is located may be configured by an access network device, or may be reserved by the terminal device.

Figure 4:
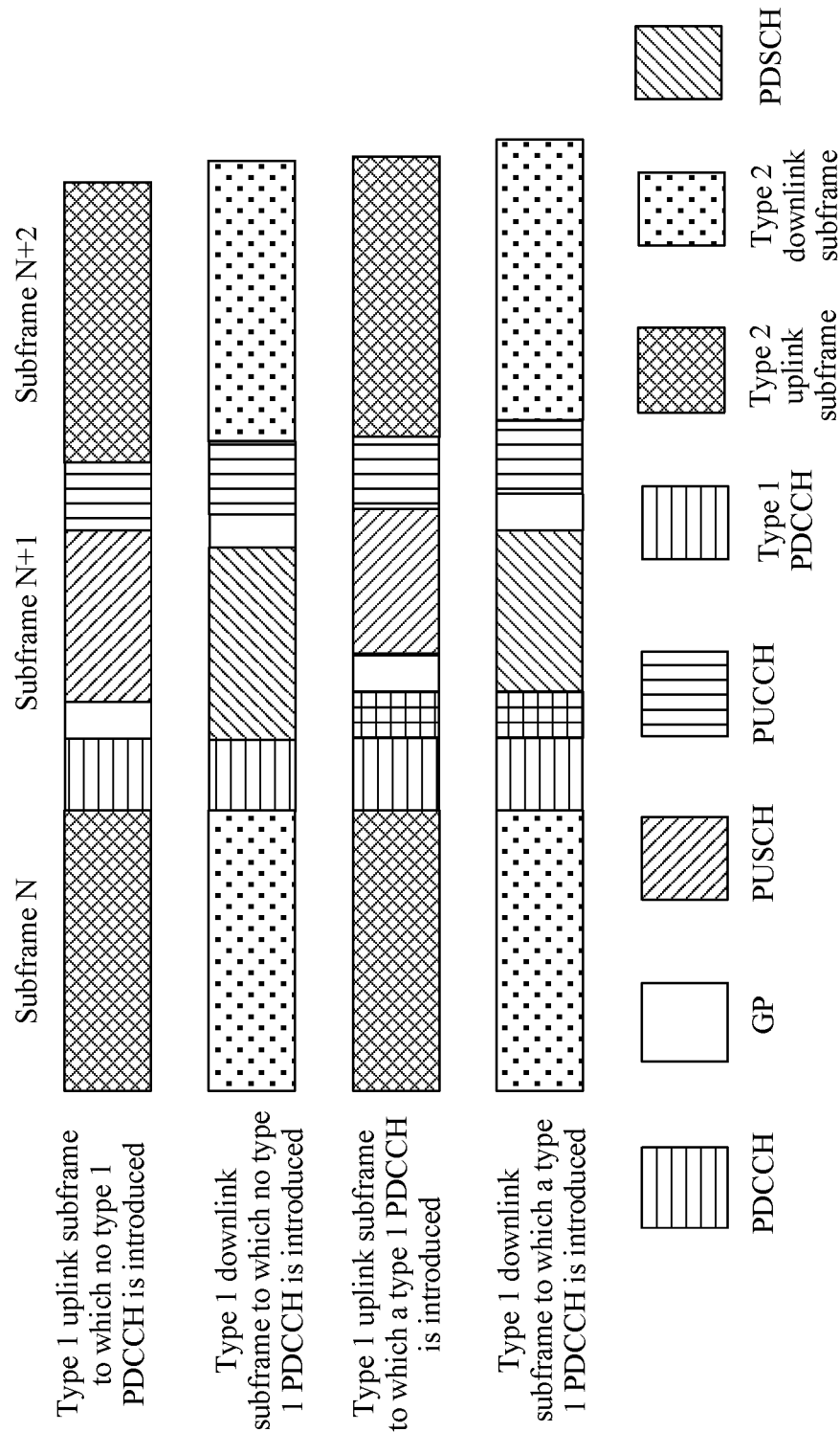
FIG. 4 is a schematic diagram of comparison between a type 1 subframe to which a type 1 PDCCH is introduced and a type 1 subframe to which no type 1 PDCCH is introduced.

FIG. 4 is a schematic diagram of comparison between a type 1 subframe to which a type 1 PDCCH is introduced and a type 1 subframe to which no type 1 PDCCH is introduced. As shown in FIG. 4, a subframe N+1 in a first row is a type 1 uplink subframe to which no type 1 PDCCH is introduced, and a subframe N+1 in a third row is a type 1 uplink subframe to which a type 1 PDCCH is introduced. According to comparison between the subframe N+1 in the first row and the subframe N+1 in the third row, it can be learned that the type 1 PDCCH is added between the PDCCH of the type 1 uplink subframe and a guard period. Correspondingly, a time domain resource occupied by a PUSCH is reduced. The PDCCH of the type 1 uplink subframe is a type 2 PDCCH. A subframe N+1 in a second row is a type 1 downlink subframe to which no type 1 PDCCH is introduced, and a subframe N+1 in a fourth row is a type 1 downlink subframe to which a type 1 PDCCH is introduced. According to comparison between the subframe N+1 in the second row and the subframe N+1 in the fourth row, it can be learned that the type 1 PDCCH is added between the PDCCH of the type 1 downlink subframe and a PDSCH. The PDCCH of the type 1 downlink subframe is a type 2 PDCCH.

In this embodiment, the type 1 PDCCH is also referred to as a group PDCCH, a common PDCCH, or a group common PDCCH. A group may correspond to at least one of a time domain resource, a frequency domain resource, and a space domain resource. When the group corresponds to a time domain resource, the group may indicate a time period. In other words, the type 1 PDCCH includes configuration information of a transmission direction within the time period. The time period may be a continuous time period, or may be discontinuous time periods. The time period may include a plurality of frequency domain units. When the group corresponds to a frequency domain resource, the group may indicate at least one of a carrier, a frequency band, and a sub-band. In other words, the type 1 PDCCH includes configuration information of transmission directions of one or more carriers, sub-bands, or frequency bands. The carrier may be a carrier frequency band. When the group corresponds to a space domain resource, the group may indicate at least one of a beam and an antenna port. In other words, the type 1 PDCCH includes configuration information of transmission directions of one or more beams or antenna ports.

In this embodiment, the type 1 PDCCH includes first DCI. The first DCI is DCI newly defined in this application. In an implementation, the first DCI includes at least one information block, and each information block includes configuration information of a transmission direction of at least one resource unit. The at least one resource unit includes at least one of a frequency domain unit, a time domain unit, and a space domain unit. The first DCI is also referred to as group DCI, common DCI, or group common DCI. A group may correspond to at least one of a time domain resource, a frequency domain resource, and a space domain resource. When the group corresponds to a time domain resource, each information block of the first DCI may include configuration information of a transmission direction within a time period. The time period may be a continuous time period, or may be discontinuous time periods. The time period may include a plurality of time domain units. When the group corresponds to a frequency domain resource, each information block of the first DCI indicates configuration information of transmission directions of one or more carriers, sub-bands, or frequency bands. When the group corresponds to a space domain resource, each information block includes configuration information of transmission directions of one or more beams and/or one or more antenna ports.

Figure 5:
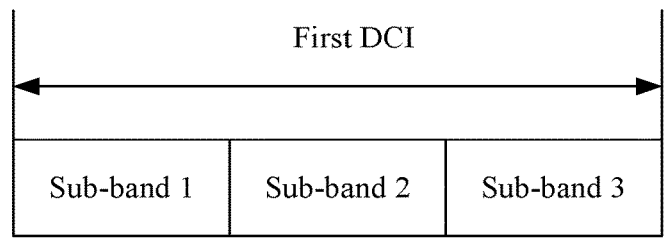
FIG. 5 is a schematic diagram of first DCI.

FIG. 5 is a schematic diagram of first DCI. As shown in FIG. 5, the first DCI includes three information blocks. A first information block includes configuration information of a transmission direction of a sub-band 1, a second information block includes configuration information of a transmission direction of a sub-band 2, and a third information block includes configuration information of a transmission direction of a sub-band 3. Optionally, each information block may include configuration information of transmission directions in a plurality of frequency domain units obtained through pre-division. For example, the first DCI includes three information blocks. A first information block includes configuration information of a transmission direction of a carrier 1 to configuration information of a transmission direction of a carrier 5, a second information block includes configuration information of a transmission direction of a carrier 6 to configuration information of a transmission direction of a carrier 10, and so on. When a group corresponds to a space domain resource, each information block of the first DCI indicates configuration information of transmission directions of one or more beams or antenna ports. For example, the first DCI includes three information blocks. A first information block includes configuration information of a transmission direction of a beam 1, a second information block includes configuration information of a transmission direction of a beam 2, and a third information block includes configuration information of a transmission direction of a beam 3. Optionally, each information block may include configuration information of transmission directions in a plurality of space domain units obtained through pre-division. For example, the first DCI includes three information blocks. A first information block includes configuration information of a transmission direction of a beam 1 to configuration information of a transmission direction of a beam 5, a second information block includes configuration information of a transmission direction of a beam 6 to configuration information of a transmission direction of a beam 10, and so on. In addition, the group may alternatively correspond to a combination of any two or three of a time domain resource, a frequency domain resource, and a space domain resource. For example, when the group corresponds to a space domain resource and a frequency domain resource, each information block of the first DCI indicates configuration information of transmission directions of one or more carriers, sub-bands, or frequency bands on one or more transmission beams.

Optionally, each information block further includes effective-time information of the configuration information. The effective-time information is used to indicate an effective time of the corresponding configuration information. The effective-time information includes at least one of the following information: an effect start moment and effective duration. A period of effective time may be uniquely determined based on the effect start moment and the effective duration. The effective duration may also be referred to as a time window. When the effective-time information includes only effective duration, an effect start moment in the configuration information may be a default value. For example, the effect start moment is notification time of the effective-time information, and the notification time of the effective-time information is time at which the first DCI is received. Alternatively, a relationship between the effect start moment and notification time of the effective-time information is pre-specified by the terminal device or pre-configured by an access network device. In this case, the terminal device determines the effect start moment based on the relationship between the effect start moment and the notification time. For example, if the relationship between the effect start moment and the notification time is that the effect start moment is 2 ms later than the notification time, the terminal device obtains the effect start moment by adding 2 ms to the notification time.

The first configuration information, effective-time information of the first configuration information, the second configuration information, and effective-time information of the second configuration information may be indicated in the first DCI by using indexes. Correspondingly, a correspondence between an index of an effective time and an index of configuration information may be pre-specified or pre-configured as an index table. The index table may be broadcast in system information or pre-configured by an operation, administration, and management (operation, administration, and management, OAM for short) center. In the index table, an index 1 (index 1) may be used to indicate an index of configuration information corresponding to a default effective time, and an index 2 may be used to indicate a relationship between an index of a valid effective time and an index of configuration information. The valid effective time is not the default effective time. Different configuration information is distinguished by using configuration information indexes. Table 1 is a correspondence between an index of a default effective time and an index of configuration information.

TABLE 1

| Index of bits in a type 1 PDCCH | Index (index 1) of configuration information |
|---|---|
| 001 | 1 |
| 010 | 2 |
| 100 | 3 |
| ... | ... |

As shown in Table 1, the default effective time is indicated by 3 bits. The 3 bits can indicate a total of eight default effective times, and each default effective time corresponds to one or more types of configuration information. For example, when each default effective time corresponds to one type of configuration information, a default effective time indicated by 001 corresponds to configuration information whose index is 1, a default effective time indicated by 010 corresponds to configuration information whose index is 2, and a default effective time indicated by 100 corresponds to configuration information whose index is 3. If an effective time of the first configuration information and/or an effective time of the second configuration information are/is a default effective time, the default effective time used by the first configuration information and/or the second configuration information is indicated by using corresponding bits in the first DCI. The bits used to indicate the default effective time may be pre-configured by an access network device.

Table 2 is a relationship between an index of a valid effective time and an index of configuration information.

TABLE 2

| Index (index 2) of a valid effective time | Index (index 1) of configuration information |
|---|---|
| 1 | 1, 2, 3 |
| 2 | 4, 5, 6 |
| 3 | 7, 8, 9 |
| ... | ... |

As shown in Table 2, indexes of the valid effective times are, for example, 1, 2, and 3, and each valid effective time corresponds to a plurality of types of configuration information. For example, a valid effective time indicated by a valid effective time index 1 corresponds to configuration information whose indexes are 1, 2, and 3, a valid effective time indicated by a valid effective time index 2 corresponds to configuration information whose indexes are 4, 5, and 6, and a valid effective time indicated by a valid effective time index 3 corresponds to configuration information whose indexes are 7, 8, and 9.

Correspondingly, in the first DCI, a series of bits correspond to the configuration information whose index is 1, and a series of bits correspond to a combination of the configuration information whose index is 2 and the configuration information whose index is 1. For example, in each information block of the first DCI, 3 bits are occupied to indicate the configuration information whose index is 1, and 5 bits are occupied to indicate the combination of the configuration information whose index is 2 and the configuration information whose index is 1. Specifically, specific configuration information that is applied and an effective time of the configuration information may be displayed by activating or deactivating bits. Certainly, in another implementation, alternatively, an access network device may explicitly indicate an index of configuration information, or an index of configuration information and an index of an effective time. For example, the access network device may use higher layer signaling (for example, an RRC message) to carry the index of the configuration information and the index of the effective time, or use MAC layer signaling or physical layer signaling to carry the index of the configuration information and the index of the effective time. In addition, in another implementation, alternatively, an access network device may explicitly indicate configuration information, or configuration information and an effective time. For example, the access network device may use higher layer signaling (for example, an RRC message) to carry the configuration information and the effective time, or use MAC layer signaling or physical layer signaling to carry the configuration information and the effective time.

When the first DCI includes a plurality of information blocks, the terminal device needs to learn a start resource location of each information block, so that content in the information block can be accurately read. Optionally, the terminal device receives higher layer configuration signaling sent by a network device, where the higher layer configuration signaling includes a parameter of a start resource location of each information block, and the terminal device obtains the start resource location of each information block based on the parameter of the start resource location of each information block, and then reads content in each information block from the type 1 PDCCH based on the start resource location of each information block.

If the terminal device has x pieces (x is greater than or equal to 1) of configuration information and m information blocks, the following fields may be defined in each information block: a time length indicator field and a configuration indicator field. One time length indicator may be indicated by 0 or y (y is greater than or equal to 1) bits, where 0 means that a default effective time is used, and the default effective time may be one time domain unit. The configuration indicator field may include a plurality of configuration numbers. For example, the configuration indicator field is: a configuration number 1, a configuration number 2, . . . , and a configuration number n. The n configuration indicator fields correspond to a set of predefined, pre-notified, or pre-broadcast configuration information.

Likewise, if the terminal device has x pieces of configuration information and m information blocks, the following fields may be defined in each information block: a carrier indicator field and a configuration indicator field. The carrier indicator field may indicate one carrier or a plurality of carriers. The configuration indicator field may include a plurality of configuration numbers. For example, the configuration indicator field is: a configuration number 1, a configuration number 2, . . . , and a configuration number n. The n configuration indicator fields correspond to a set of pre-defined, pre-notified, or pre-broadcast configuration information. Alternatively, "carrier" in the carrier indicator field may be replaced with "frequency band" or "sub-band."

Likewise, if the terminal device has x pieces of configuration information and m information blocks, the following fields may be defined in each information block: a beam indicator field and a configuration indicator field. The beam indicator field may indicate one beam or a plurality of beams. The configuration indicator field may include a plurality of configuration numbers. For example, the configuration indicator field is: a configuration number 1, a configuration number 2, . . . , and a configuration number n. The n configuration indicator fields correspond to a set of pre-defined, pre-notified, or pre-broadcast configuration information. Alternatively, "beam" in the beam indicator field may be replaced with "antenna port."

The foregoing descriptions are merely examples. In practice, each information block may include configuration information of a transmission direction of one or a combination of a plurality of any time domain resource, frequency domain resource, and space domain resource.

Optionally, at least one of the first configuration information and the effective-time information of the first configuration information may be carried by using higher layer signaling. Likewise, at least one of the second configuration information and the effective-time information of the second configuration information is carried by using higher layer signaling. Optionally, configuration of higher layer signaling is activated by a corresponding bit in the first DCI. For example, if it is pre-learned, based on the higher layer signaling, that there are five pieces of optional effective-time information and corresponding indexes, a corresponding bit is set in the first DCI to indicate that an index of which piece of effective-time information is activated.

Optionally, before receiving the type 1 PDCCH sent by the first access network device, the terminal device receives activation indication information that is of the type 1 PDCCH and that is sent by the first access network device; and before receiving the type 1 PDCCH sent by the second access network device, the terminal device receives activation indication information that is of the type 1 PDCCH and that is sent by the second access network device. The activation indication information of the type 1 PDCCH is used to notify the terminal device that the access network device is to use the type 1 PDCCH.

Optionally, transmit power of the type 1 PDCCH is greater than transmit power of the type 2 PDCCH. Because the type 1 PDCCH sent by the access network device not only needs to be received by a terminal device in a local cell, but also needs to be received by a terminal device in a neighboring cell, but the type 2 PDCCH usually needs to be received only by a terminal device in a local cell, the type 1 PDCCH needs higher transmit power than the type 2 PDCCH does. The terminal device needs to demodulate the type 1 PDCCH based on a power ratio of the type 1 PDCCH to a common reference signal (Common Reference Signal, CRS for short). Correspondingly, the terminal device receives a first determining parameter, sent by the first access network device, of a first power ratio of the type 1 PDCCH to the CRS, and/or the terminal device receives a second determining parameter, sent by the second access network device, of a second power ratio of the type 1 PDCCH to the CRS. The terminal device determines the first power ratio based on the first determining parameter, and demodulates, based on the first power ratio, the type 1 PDCCH sent by the first access network device; and the terminal device determines the second power ratio based on the second determining parameter, and demodulates, based on the second power ratio, the type 1 PDCCH sent by the second access network device. The first determining parameter and the second determining parameter may be indicated or pre-notified by using Radio Resource Control (Radio Resource Control, RRC for short) signaling, for example, broadcast signaling. Alternatively, the first determining parameter and the second determining parameter may be indicated or pre-notified by using physical layer signaling.

Optionally, the effective duration of the configuration information is less than an X2 interface switching time. An X2 interface is an interconnection interface between e-NBs and supports direct transmission of data and signaling. For example, if a delay of the X2 interface is 10 ms to 20 ms, the effective duration of the configuration information is less than 10 ms.

The above-mentioned method for sending the first configuration information and the second configuration information is applicable to a terminal device in a connected mode. A terminal device in an idle mode cannot receive the type 1 PDCCH. The terminal device in the idle mode can obtain configuration information of a transmission direction of a time-frequency resource only after accessing a network and receiving a first type 1 PDCCH. Therefore, some enhanced manners need to be used for the terminal device in the idle mode, so that the terminal device in the idle mode can obtain configuration information of a transmission direction of a time-frequency-space resource as soon as possible.

In this embodiment, the configuration information of the transmission direction of the time-frequency-space resource is carried in a random access process. The random access process includes a contention-based random access process and a non-contention-based random access process. In the contention-based random access process, the terminal device randomly selects a preamble sequence (in an LTE system, each cell has 64 available preamble sequences) to initiate a random access process to a network side, and if a plurality of terminal devices use, at a same moment, a same preamble sequence to initiate a random access process, a conflict occurs, and access may fail. In the non-contention-based random access process, the terminal device uses a preamble sequence allocated by a base station, to initiate a random access process, and therefore, no conflict occurs, and an access success rate is relatively high.

The contention-based random access process mainly includes four steps: (1) The terminal device randomly selects a preamble sequence and sends the preamble sequence on a random access channel (RACH). (2) After detecting the preamble sequence sent by the terminal device, the base station sends a random access response (RAR) to the terminal device. (3) After receiving the random access response, the terminal device sends an uplink message on an allocated uplink resource as indicated by the random access response. (4) The base station receives the uplink message sent by the terminal device and sends a conflict resolution message to the terminal device.

The non-contention-based random access process mainly includes three steps: (1) The base station designates a dedicated preamble sequence by using dedicated signaling. (2) The terminal device sends, on a RACH, the preamble sequence allocated by the base station. (3) After receiving the preamble sequence sent by the terminal device, the base station sends a random access response to the terminal device.

For a terminal device in an idle mode that performs downlink receiving, the first configuration information may be carried in a random access response message or a contention resolution message sent by the first access network device, and the second configuration information may be carried in a random access response message or a contention resolution message sent by the second access network device. The random access response message may be a third message in the non-contention-based random access process, or may be a second message in the contention-based random access process. The contention resolution message is a fourth message in the contention-based random access process.

For a terminal device in an idle mode that performs uplink sending, the first configuration information is carried in a paging (paging) message sent by the first access network device, and the second configuration information is carried in a paging message sent by the second access network device. In the LTE system, if a network side needs to send data to the terminal device in the idle mode, a mobility management entity (MME) needs to send a paging message to all eNBs in a tracking area (Tracking Area, TA for short) with which the terminal device registers, and then the eNB sends a paging message over an air interface (Uu interface), and all terminal devices in the idle mode in a cell receive the paging message. In this embodiment, the first configuration information or the second configuration information is carried in the paging message, so that the terminal device in the idle mode can obtain configuration information of a transmission direction of a time-frequency-space resource in time.

Optionally, the random access response message or the contention resolution message sent by the first access network device further includes the effective-time information of the first configuration information. The random access response message or the contention resolution message sent by the second access network device further includes the effective-time information of the second configuration information. The paging message sent by the first access network device further includes the effective-time information of the first configuration information and the paging message sent by the second access network device further includes the effective-time information of the second configuration information.

Optionally, the effective-time information includes at least one of the following information: an effect start moment and effective duration. The effect start moment and the effective duration may uniquely determine an effective time of configuration information of a transmission direction of one time-frequency-space resource. When the effective-time information includes only the effective duration, a relationship between the effect start moment and notification time of the effective-time information is pre-specified or pre-configured.

Optionally, the first configuration information is scrambled by using a first radio network temporary identifier (Radio Network Temporary Identity, RNTI for short), and the second configuration information is scrambled by using a second RNTI. Correspondingly, when receiving the first configuration information, the terminal device descrambles the first configuration information by using the first RNTI, and when receiving the second configuration information, the terminal device descrambles the second configuration information by using the second RNTI.

To ensure that the terminal device can accurately receive the first configuration information sent by the first access network device and the second configuration information sent by the second access network device, a first sending resource used by the first access network device to send the first configuration information is orthogonal to a second sending resource used by the second access network device to send the second configuration information. Correspondingly, before receiving the first configuration information sent by the first access network device and/or the second configuration information sent by the second access network device, the terminal device receives sending resource information for the first configuration information and/or receives sending resource information for the second configuration information, where a first sending resource indicated by the sending resource information for the first configuration information is orthogonal to a second sending resource indicated by the sending resource information for the second configuration information. In this way, the terminal device receives the first configuration information on the first sending resource based on the sending resource information for the first configuration information and receives the second configuration information on the second sending resource based on the sending resource information for the second configuration information. To ensure that the first sending resource and the second sending resource do not interfere with each other, the first access network device and the second access network device need to mutually coordinate on at least one of a time domain resource, a frequency domain resource, and a code domain resource, so that the first sending resource and the second sending resource do not interfere with each other, thereby ensuring that the first sending resource and the second sending resource do not interfere with each other in terms of reception and demodulation of the type 1 PDCCH. The mutual coordination may be signaling coordination performed based on an interface between access network devices or coordination performed through OAM.

In this embodiment, the first access network device and the second access network device may have totally identical transmission directions in a time domain unit, or may have different transmission directions in at least one time domain unit.

It should be noted that in this embodiment, all information used by the terminal device to perform detection or decoding needs to be mutually notified between cells, or be preconfigured for an access network device, and be notified by the access network device to the terminal device, or be directly configured for the terminal device. The information used for detection or decoding includes information about a resource in which the type 1 PDCCH is located, RNTI information used for descrambling the first configuration information and the second configuration information, and format information of the first DCI.

Step S102: The terminal device transmits data based on the first configuration information and/or the second configuration information.

If the terminal device is served by a cell covered by the first access network device, the terminal device transmits data in an indicated resource unit based on the first configuration information. If the terminal device is served by a cell covered by the second access network device, the terminal device transmits data in an indicated resource unit based on the second configuration information. The resource unit includes one or more of a time domain unit, a frequency domain unit, and a space domain unit.

If the terminal device is served by a cell covered by the first access network device, a cell covered by the second access network device is a neighboring cell of the terminal device, and cross slot interference may occur in at least one of a time domain unit, a frequency domain unit, and a space domain unit between the first access network device and the second access network device. In this embodiment, because the terminal device can receive the configuration information of the transmission direction of the second access network device in the at least one resource unit, the terminal device may cancel or alleviate the cross slot interference based on the configuration information of the transmission direction of the second access network device in the at least one resource unit.

For example, the terminal device may generate any one of a possible power control parameter, a channel measurement manner, and an anti-interference manner based on the first configuration information and/or the second configuration information. The anti-interference manner includes an overload indicator (OI) or a high interference indicator (HII). Specifically, when the terminal device belongs to the cell covered by the first access network device, the terminal device obtains the first configuration information, in other words, obtains a transmission direction of a time-frequency-space resource of a serving cell. If the terminal device further obtains the second configuration information, the terminal device may obtain a transmission direction of a time-frequency-space resource of a neighboring cell. Based on the first configuration information and the second configuration information, the terminal device may learn, through inference, one or more resource units (including at least one of a time domain unit, a frequency domain unit, and a space domain unit) in which there is interference between different link directions, namely, cross link interference, and one or more resource units (including at least one of a time domain unit, a frequency domain unit, and a space domain unit) in which there is interference between same link directions. The terminal device uses specific interference control manners to overcome such different types of interference. For example, for a same link direction and different link directions, different power control parameters are used; or for a same link direction and different link directions, different OI/HII interference reports are distinguished; or for a same link direction and different link directions, different channel measurement manners are used.

In this embodiment, the terminal device receives the first configuration information sent by the first access network device and/or the second configuration information sent by the second access network device. The first configuration information includes the configuration information of the transmission direction of the first access network device in the at least one resource unit, the second configuration information includes the configuration information of the transmission direction of the second access device in the at least one resource unit, and the at least one resource unit includes at least one of a frequency domain unit, a time domain unit, and a space domain unit. The terminal device transmits data based on the first configuration information and/or the second configuration information. In this method, one cycle includes an unlimited quantity of resource units and may include more types of resource units, and different types and different quantities of resource units correspond to more distribution manners, in other words, configuration modes or structures are also more diversified. In this way, configuration of a transmission direction of a time-frequency-space resource becomes more flexible, and a dynamically changing service requirement can be met.

Figure 6:
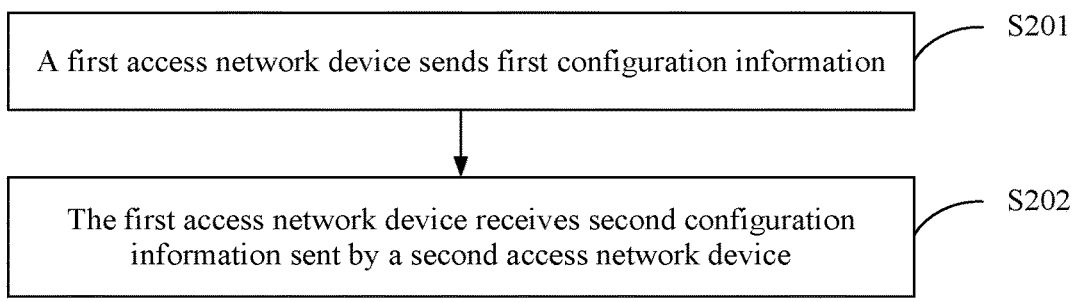
FIG. 6 is a flowchart of a method for configuring a transmission direction of a time-frequency resource according to Embodiment 2.

FIG. 6 is a flowchart of a method for configuring a transmission direction of a time-frequency resource according to Embodiment 2. As shown in FIG. 6, the method provided in this embodiment may include the following steps.

Step S201: A first access network device sends first configuration information.

The first configuration information includes configuration information of a transmission direction of the first access network device in at least one resource unit, and the at least one resource unit includes at least one of a frequency domain unit, a time domain unit, and a space domain unit.

Step S202: The first access network device receives second configuration information sent by a second access network device.

The second configuration information includes configuration information of a transmission direction of the second access network device in at least one resource unit, and the at least one resource unit includes at least one of a frequency domain unit, a time domain unit, and a space domain unit. The first access network device and the second access network device may have totally identical transmission directions in a resource unit, or may have different transmission directions in at least one resource unit.

In this embodiment, the frequency domain unit includes at least one of a frequency band, a sub-band, and a PRB. The time domain unit includes at least one of a super frame, a frame, a slot, a subframe, a mini-subframe, a mini-slot, an OFDM symbol, and a time unit shorter than one OFDM symbol. The space domain unit includes at least one of a beam and an antenna port.

Optionally, before the first access network device sends the first configuration information and the second access network device sends the second configuration information, the first access network device negotiates with the second access network device, to determine a first sending resource used for sending the first configuration information and a second sending resource used for sending the second configuration information, where the first sending resource is orthogonal to the second sending resource. Then, the first access network device sends the first configuration information on the first sending resource and the second access network device sends the second configuration information on the second sending resource.

Optionally, a first sending resource used by the first access network device to send the first configuration information and a second sending resource used by the second access network device to send the second configuration information are configured through OAM.

Optionally, the first configuration information and the second configuration information are separately carried on a type 1 PDCCH, and the type 1 PDCCH is used to carry configuration information of a transmission direction of a time-frequency-space resource. In this embodiment, the type 1 PDCCH may be included in any one of the following subframes: a type 1 uplink subframe, a type 2 uplink subframe, a type 1 downlink subframe, and a type 2 downlink subframe.

A time domain resource in which the type 1 PDCCH is located may be an OFDM symbol following a type 2 PDCCH, or a time domain resource in which the type 1 PDCCH is located may be some of resources for transmitting a type 2 PDCCH. In this embodiment, the type 1 PDCCH is also referred to as a group PDCCH, a common PDCCH, or a group common PDCCH. A group (group) may correspond to at least one of a time domain resource, a frequency domain resource, and a space domain resource. For a specific meaning of the group, refer to detailed descriptions in Embodiment 1. Details are not described herein again.

In this embodiment, the type 1 PDCCH includes first DCI. The first DCI is DCI newly defined in this application. In an implementation, the first DCI includes at least one information block, and each information block includes configuration information of a transmission direction of at least one resource unit. The first DCI is also referred to as group DCI, common DCI, or group common DCI. A group may correspond to at least one of a time domain resource, a frequency domain resource, and a space domain resource. For a specific meaning of the group, refer to detailed descriptions in Embodiment 1. Details are not described herein again.

Optionally, each information block further includes effective-time information of the configuration information. The effective-time information is used to indicate an effective time of the corresponding configuration information. The effective-time information includes at least one of the following information: an effect start moment and effective duration. A period of effective time may be uniquely determined based on the effect start moment and the effective duration.

Step 201 or 202 is optional. In other words, this embodiment may include either step 202 or step 201.

In this application, activation indication information of the type 1 PDCCH may also be referred to as existence indication information of the type 1 PDCCH or information indicating whether the type 1 PDCCH is to be configured.

The method for configuring a transmission direction of a time-frequency-space resource may be extended to resource configuration in any 5G system, for example, resource configuration in a new radio system, but is not limited to a flexible duplex system. Configuration of the time-frequency-space resource may be applied to any 5G system. Configuration of the time-frequency-space resource may be applied to any 5G high-frequency system. The high-frequency system may be a millimeter-wave system.

Figure 7:
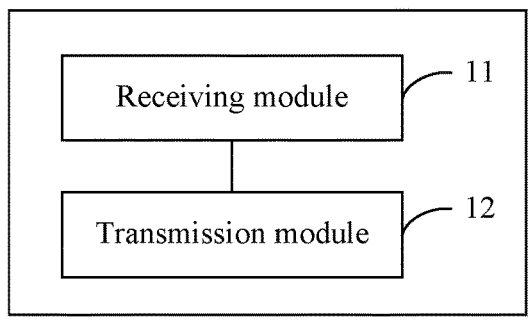
FIG. 7 is a schematic structural diagram of a terminal device according to Embodiment 3.

FIG. 7 is a schematic structural diagram of a terminal device according to Embodiment 3. As shown in FIG. 7, the terminal device in this embodiment includes:

a receiving module 11, configured to receive first configuration information sent by a first access network device, where the first configuration information includes configuration information of a transmission direction of the first access network device in at least one resource unit, and the at least one resource unit includes at least one of a frequency domain unit, a time domain unit, and a space domain unit; and a transmission module 12, configured to transmit data based on the first configuration information.

Optionally, the receiving module 11 is further configured to receive second configuration information sent by a second access network device, where the second configuration information includes configuration information of a transmission direction of the second access network device in at least one resource unit, and the at least one resource unit includes at least one of a frequency domain unit, a time domain unit, and a space domain unit.

Optionally, the first configuration information is carried on a type 1 physical downlink control channel PDCCH, and the type 1 PDCCH is used to carry configuration information of a transmission direction of a time-frequency resource or a time-frequency-space resource.

Optionally, the second configuration information is carried on a type 1 physical downlink control channel PDCCH, and the type 1 PDCCH is used to carry configuration information of a transmission direction of a time-frequency resource or a time-frequency-space resource.

Optionally, the type 1 PDCCH is included in any one of the following subframes: a type 1 uplink subframe, a type 2 uplink subframe, a type 1 downlink subframe, and a type 2 downlink subframe.

The type 1 uplink subframe includes a PDCCH, a guard period, a physical uplink shared channel PUSCH, and a physical uplink control channel PUCCH.

The type 2 uplink subframe includes a PUCCH and a PUSCH.

The type 1 downlink subframe includes a PDCCH, a PDSCH, a guard period, and a PUCCH.

The type 2 downlink subframe includes a PDCCH and a PDSCH.

Optionally, a time domain resource in which the type 1 PDCCH is located is an orthogonal frequency division multiplexing OFDM symbol following a type 2 PDCCH, or a time domain resource in which the type 1 PDCCH is located is some of resources used for transmitting a type 2 PDCCH, where the type 2 PDCCH is used to carry scheduling information of the terminal device.

Optionally, the receiving module 11 is further configured to:

receive, by the terminal device, activation indication information that is of the type 1 PDCCH and that is sent by the first access network device.

Optionally, the receiving module 11 is further configured to receive activation indication information that is of the type 1 PDCCH and that is sent by the second access network device.

Optionally, transmit power of the type 1 PDCCH is greater than transmit power of the type 2 PDCCH, and the type 2 PDCCH is used to carry scheduling information of the terminal device.

Optionally, the type 1 PDCCH includes first DCI, and the first DCI includes configuration information of a transmission direction of at least one resource unit and/or effective-time information of the configuration information.

Optionally, the first DCI includes at least one information block, and each information block includes configuration information of a transmission direction of at least one resource unit and/or an effective time of the configuration information.

Optionally, the receiving module 11 is further configured to: receive higher layer configuration signaling sent by a network device, where the higher layer configuration information includes a parameter of a start resource location of each information block; and read each information block from the type 1 PDCCH based on the start resource location of each information block.

Optionally, the receiving module 11 is further configured to receive effective-time information of the first configuration information and/or effective-time information of the second configuration information.

Optionally, at least one of the first configuration information and the effective-time information of the first configuration information is carried by using higher layer signaling, and at least one of the second configuration information and the effective-time information of the second configuration information is carried by using higher layer signaling.

Optionally, the first configuration information is carried in a random access response message or a contention resolution message sent by the first access network device.

Optionally, the second configuration information is carried in a random access response message or a contention resolution message sent by the second access network device.

Optionally, the random access response message or the contention resolution message sent by the first access network device further includes the effective-time information of the first configuration information.

Optionally, the random access response message or the contention resolution message sent by the second access network device further includes the effective-time information of the second configuration information.

Optionally, the first configuration information is carried in a paging message sent by the first access network device.

Optionally, the second configuration information is carried in a paging message sent by the second access network device.

Optionally, the paging message sent by the first access network device further includes the effective-time information of the first configuration information.

Optionally, the paging message sent by the second access network device further includes the effective-time information of the second configuration information.

Optionally, the effective-time information includes at least one of the following information: an effect start moment and effective duration.

Optionally, when the effective-time information includes only the effective duration, a relationship between the effect start moment and notification time of the effective-time information is pre-specified or pre-configured.

Optionally, the frequency domain unit includes at least one of a frequency band, a sub-band, and a physical resource block PRB, the time domain unit includes at least one of a super frame, a frame, a slot, a subframe, a mini-subframe, a mini-slot, an OFDM symbol, and a time unit shorter than one OFDM symbol, and the space domain unit includes at least one of a beam and an antenna port, where the mini-subframe is shorter than the subframe, and the mini-slot is shorter than the slot.

Optionally, the first configuration information is scrambled by using a first RNTI, and the second configuration information is scrambled by using a second RNTI.

Optionally, the receiving module 11 is further configured to:

receive sending resource information for the first configuration information and/or receive sending resource information for the second configuration information, where a first sending resource indicated by the sending resource information for the first configuration information is orthogonal to a second sending resource indicated by the sending resource information for the second configuration information.

Optionally, the first access network device and the second access network device have different transmission directions in at least one resource unit.

The terminal device in this embodiment may be configured to perform the steps performed by the terminal device in Embodiment 1 and Embodiment 2. Specific implementations and technical effects of the terminal device in this embodiment are similar to those of the terminal device in Embodiment 1 and Embodiment 2. Details are not described herein again.

Figure 8:
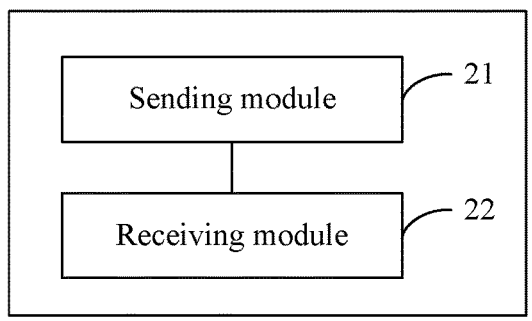
FIG. 8 is a schematic structural diagram of an access network device according to Embodiment 4.

FIG. 8 is a schematic structural diagram of an access network device according to Embodiment 4. As shown in FIG. 8, the access network device in this embodiment includes:

a sending module 21, configured to send first configuration information, where the first configuration information includes configuration information of a transmission direction of the first access network device in at least one resource unit, and the at least one resource unit includes at least one of a frequency domain unit, a time domain unit, and a space domain unit; and a receiving module 22, configured to receive second configuration information sent by a second access network device, where the second configuration information includes configuration information of a transmission direction of the second access network device in at least one resource unit, and the at least one resource unit includes at least one of a frequency domain unit, a time domain unit, and a space domain unit.

Optionally, the access network device further includes: a determining module, configured to negotiate with the second access network device, to determine a first sending resource used for sending the first configuration information and a second sending resource used for sending the second configuration information, where the first sending resource is orthogonal to the second sending resource.

Optionally, a first sending resource used by the first access network device to send the first configuration information and a second sending resource used by the second access network device to send the second configuration information are configured by an operation, administration, and management OAM center.

Optionally, the first configuration information is carried on a type 1 physical downlink control channel PDCCH, and the type 1 PDCCH is used to carry configuration information of a transmission direction of a time-frequency resource or a time-frequency-space resource.

Optionally, the second configuration information is carried on a type 1 physical downlink control channel PDCCH, and the type 1 PDCCH is used to carry configuration information of a transmission direction of a time-frequency resource or a time-frequency-space resource.

Optionally, the first configuration information is scrambled by using a first RNTI, and the second configuration information is scrambled by using a second RNTI.

The access network device in this embodiment may be configured to perform the steps performed by the access network device in Embodiment 1 and Embodiment 2. Specific implementations and technical effects of the access network device in this embodiment are similar to those of the access network device in Embodiment 1 and Embodiment 2. Details are not described herein again.

Figure 9:
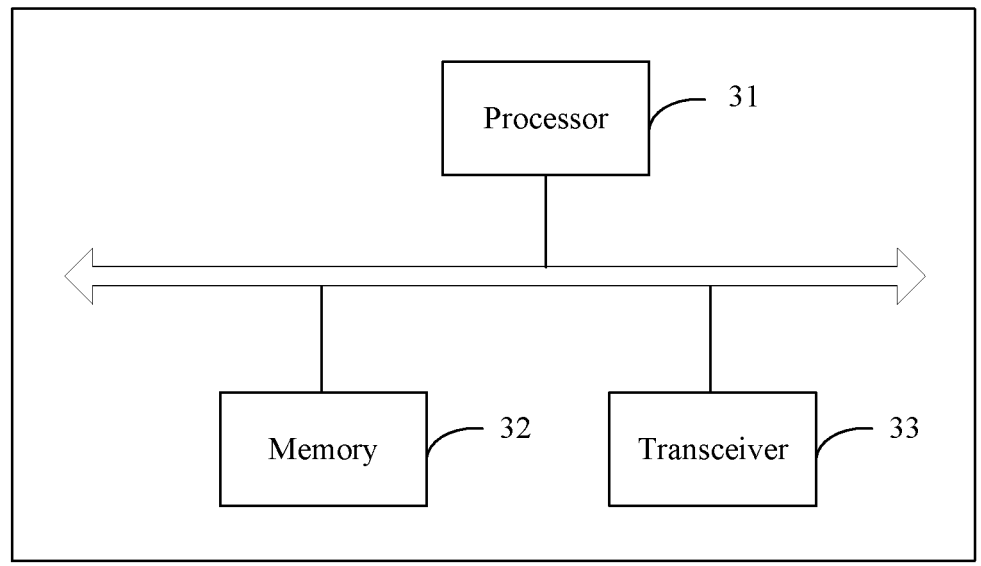
FIG. 9 is a schematic structural diagram of a terminal device according to Embodiment 5.

FIG. 9 is a schematic structural diagram of a terminal device according to Embodiment 5. As shown in FIG. 9, the terminal device includes a processor 31, a memory 32, and a transceiver 33. The memory 32 is configured to store an instruction. The transceiver 33 is configured to communicate with another device. The processor 31 is configured to execute the instruction stored in the memory 32, so that the terminal device performs the steps performed by the terminal device in Embodiment 1 and Embodiment 2. Specific implementations and technical effects of the terminal device in this embodiment are similar to those of the terminal device in Embodiment 1 and Embodiment 2. Details are not described herein again.

Figure 10:
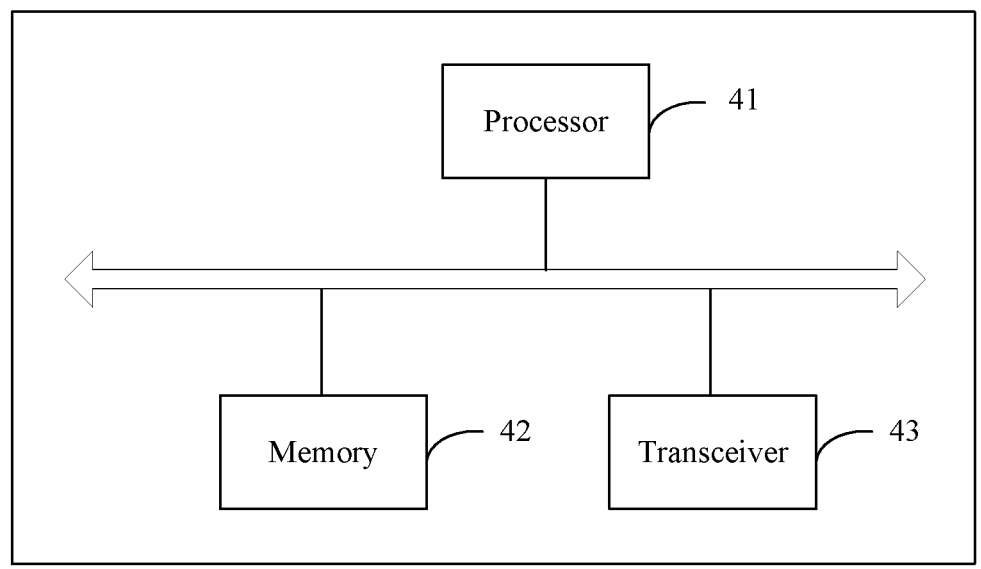
FIG. 10 is a schematic structural diagram of an access network device according to Embodiment 6.

FIG. 10 is a schematic structural diagram of an access network device according to Embodiment 6. As shown in FIG. 10, the access network device includes a processor 41, a memory 42, and a transceiver 43. The memory 42 is configured to store an instruction. The transceiver 43 is configured to communicate with another device. The processor 41 is configured to execute the instruction stored in the memory 42, so that the access network device performs the steps performed by the access network device in Embodiment 1 and Embodiment 2. Specific implementations and technical effects of the access network device in this embodiment are similar to those of the access network device in Embodiment 1 and Embodiment 2. Details are not described herein again.

It should be understood that the processor used by the access network device or the terminal device in this application may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The bus in this application may be an industry standard architecture (ISA) bus, a peripheral component interconnect (Peripheral Component, PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A method, comprising:
 receiving, by a terminal device, higher layer configuration signaling;
 receiving, by the terminal device, a first type of physical downlink control channel (PDCCH) from a first access network device, wherein the first type of PDCCH comprises first downlink control information (DCI), the first DCI comprises at least one information block, each information block of the at least one information block comprises configuration information of a transmission direction of at least one resource unit, the at least one resource unit comprises at least one of a frequency domain unit, a time domain unit, or a space domain unit, and the higher layer configuration signaling comprises a parameter of a start resource location of the each information block;
 obtaining, by the terminal device, the each information block based on the parameter of the start resource location; and
 performing, by the terminal device, data transmission based on the each information block.

2. The method of claim 1, wherein the time domain unit comprises at least one of a slot, a subframe, or an OFDM symbol.

3. The method of claim 1, further comprising:
 receiving, by the terminal device, information related to effective time of the configuration information via higher layer signaling.

4. The method of claim 3, wherein the information related to the effective time of the configuration information comprises at least one of the following information: an effect start moment or effective duration.

5. The method of claim 1, wherein the first type of PDCCH is a group common PDCCH.

6. The method of claim 1, wherein the configuration information of the transmission direction of the at least one resource unit indicates configuration information of the transmission direction within a continuous time period, and the continuous time period comprises a plurality of time domain units.

7. The method of claim 1, wherein the first DCI is scrambled by using a first radio network temporary identifier (RNTI).

8. The method of claim 1, wherein the frequency domain unit comprises at least one of a frequency band, a sub-band, or a carrier.

9. The method of claim 1, wherein the transmission direction comprises a downlink direction or an uplink direction.

10. An apparatus, comprising:
 at least one processor; and
 a memory coupled to the at least one processor and configured to store programming instructions that, when executed by the at least one processor, cause the apparatus to:
 receive higher layer configuration signaling;
 receive a first type of physical downlink control channel (PDCCH) from a first access network device, wherein the first type of PDCCH comprises first downlink control information (DCI), the first DCI comprises at least one information block, each information block of the at least one information block comprises configuration information of a transmission direction of at least one resource unit, the at least one resource unit comprises at least one of a frequency domain unit, a time domain unit, or a space domain unit, and the higher layer configuration signaling comprises a parameter of a start resource location of the each information block;
 obtain the each information block based on the parameter of the start resource location; and
 perform data transmission based on the each information block.

11. The apparatus of claim 10, wherein the time domain unit comprises at least one of a slot, a subframe, or an OFDM symbol.

12. The apparatus of claim 10, wherein the memory is further configured to store programming instructions that, when executed by the at least one processor, cause the apparatus to:
 receive information related to effective time of the configuration information via higher layer signaling.

13. The apparatus of claim 12, wherein the information related to the effective time of the configuration information comprises at least one of the following information: an effect start moment or effective duration.

14. The apparatus of claim 10, wherein the configuration information of the transmission direction of the at least one resource unit indicates configuration information of the transmission direction within a continuous time period, the continuous time period comprises a plurality of time domain units.

15. The apparatus of claim 10, wherein the first DCI is scrambled by using a first radio network temporary identifier (RNTI).

16. The apparatus of claim 10, wherein the frequency domain unit comprises at least one of a frequency band, a sub-band, or a carrier.

17. The apparatus of claim 10, wherein the transmission direction comprises a downlink direction or an uplink direction.

18. A method, comprising:
 sending, by a first access network device, higher layer configuration signaling; and
 sending, by the first access network device, a first type of physical downlink control channel (PDCCH), wherein the first type of PDCCH comprises first downlink control information (DCI), the first DCI comprises at least one information block, each information block of the at least one information block comprises configuration information of a transmission direction of at least one resource unit, the at least one resource unit comprises at least one of a frequency domain unit, a time domain unit, or a space domain unit, and the higher layer configuration signaling comprises a parameter of a start resource location of the each information block, wherein the each information block is obtained based on the parameter of the start resource location.

19. The method of claim 18, further comprising:
 sending, by the first access network device, information related to effective time of the configuration information via higher layer signaling.

20. The method of claim 18, wherein the configuration information of the transmission direction of the at least one resource unit indicates configuration information of the transmission direction within a continuous time period, and the continuous time period comprises a plurality of time domain units.

21. The method of claim 18, wherein the information related to the effective time of the configuration information comprises at least one of the following information: an effect start moment or effective duration.

22. An apparatus, comprising:
   at least one processor; and
   a memory coupled to the at least one processor and configured to store programming instructions that, when executed by the at least one processor, cause the apparatus to:
   send higher layer configuration signaling; and
   send a first type of physical downlink control channel (PDCCH), wherein the first type of PDCCH comprises first downlink control information (DCI), the first DCI comprises at least one information block, each information block of the at least one information block comprises configuration information of a transmission direction of at least one resource unit, the at least one resource unit comprises at least one of a frequency domain unit, a time domain unit, or a space domain unit, and the higher layer configuration signaling comprises a parameter of a start resource location of the each information block, wherein the each information block is obtained based on the parameter of the start resource location.

23. The apparatus of claim 22, wherein the memory is further configured to store programming instructions that, when executed by the at least one processor, cause the apparatus to:
   send information related to effective time of the configuration information via higher layer signaling.

24. The apparatus of claim 22, wherein the configuration information of the transmission direction of the at least one resource unit indicates configuration information of the transmission direction within a continuous time period, and the continuous time period comprises a plurality of time domain units.

25. The apparatus of claim 22, wherein the information related to the effective time of the configuration information comprises at least one of the following information: an effect start moment or effective duration.

* * * * *